US012639202B2

(12) United States Patent
Ma et al.

(10) Patent No.: US 12,639,202 B2
(45) Date of Patent: May 26, 2026

(54) ELECTRONIC DEVICE FOR TIMEOUT PREVENTION AND OPERATION METHOD THEREOF

(71) Applicant: Samsung Electronics Co., Ltd., Suwon-si (KR)

(72) Inventors: Jin-Hee Ma, Suwon-si (KR); Kyuho Son, Suwon-si (KR); Sangyoon Oh, Suwon-si (KR); Wonchul Lee, Suwon-si (KR); Jaigyun Lim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 20 days.

(21) Appl. No.: 18/340,413

(22) Filed: Jun. 23, 2023

(65) Prior Publication Data

US 2024/0211388 A1    Jun. 27, 2024

(30) Foreign Application Priority Data

Dec. 23, 2022    (KR) ........................ 10-2022-0183539

(51) Int. Cl.
*G06F 12/02*        (2006.01)
*G06F 3/06*          (2006.01)
(52) U.S. Cl.
CPC .................................. *G06F 12/023* (2013.01)
(58) Field of Classification Search
CPC ...................................................... G06F 12/023
USPC ...................................................... 711/154
See application file for complete search history.

(56) References Cited

U.S. PATENT DOCUMENTS

| | | | |
|---|---|---|---|
| 8,352,681 B2 | 1/2013 | Sakai et al. | |
| 10,353,628 B2 | 7/2019 | Kachare et al. | |
| 10,698,614 B2 | 6/2020 | Lee et al. | |
| 10,996,889 B2 | 5/2021 | Lee | |
| 11,455,124 B2 | 9/2022 | Agarwal et al. | |
| 2003/0023815 A1* | 1/2003 | Yoneyama ............ | G06F 3/0611 |
| | | | 711/134 |
| 2005/0114593 A1* | 5/2005 | Cassell ................. | G06F 3/0631 |
| | | | 711/170 |

(Continued)

FOREIGN PATENT DOCUMENTS

| | | | |
|---|---|---|---|
| KR | 101821845 B1 | 1/2018 | |

*Primary Examiner* — Arpan P. Savla
*Assistant Examiner* — Sidney Li
(74) *Attorney, Agent, or Firm* — Harness, Dickey & Pierce, P.L.C.

(57)        ABSTRACT

Disclosed is an electronic device including a processor configured to receive a command requesting an operation for a plurality of group zones from a host, transmit a completion response to the command to the host, and perform a background operation for the command; and a plurality of storage devices, the processor configured to control the plurality of storage devices, each of the plurality of group zones including a plurality of zones included in one or more storage devices among the plurality of storage devices, and the processor being configured to perform the background operation including generating a plurality of distribution commands for each of the plurality of storage devices from the command, and issuing one or more distribution commands among the plurality of distribution commands to one or more storage devices corresponding to the one or more distribution commands, respectively.

16 Claims, 16 Drawing Sheets

(56)                    References Cited

U.S. PATENT DOCUMENTS

| | | | |
|---|---|---|---|
| 2015/0067379 A1* | 3/2015 | Tashima .............. | G01R 31/392 |
| | | | 713/340 |
| 2017/0371548 A1* | 12/2017 | Um ..................... | G06F 3/0679 |
| 2019/0138354 A1* | 5/2019 | Kuo ..................... | G06F 9/5027 |
| 2020/0326855 A1* | 10/2020 | Wu ...................... | G06F 3/0659 |
| 2021/0011664 A1 | 1/2021 | Ross et al. | |
| 2023/0153206 A1* | 5/2023 | Hosmani .............. | G06F 11/108 |
| | | | 714/6.24 |

* cited by examiner

100

Host(10)

CMD

Resp

Processor 110

DCMD1    121    Storage Device

Z1-1
Z1-2
Z1-m

DCMD2    122    Storage Device

Z2-1
Z2-2
Z2-m

DCMDn    123    Storage Device

Zn-1
Zn-2
Zn-m

GZ0
GZ1
GZm-1

| LD(List Data) | | | | (Stored) State |
| --- | --- | --- | --- | --- |
| range | GZ | (Buffered) State | | |
| 0 | 0 | 0 | | 0 |
| | 1 | 0 | | 0 |
| | 2 | 0 | | 0 |
| | 3 | 0 | | 0 |
| 1 | 4 | 0 | | X |
| | 5 | 0 | | X |
| | 6 | X | | X |
| | 7 | X | | X |

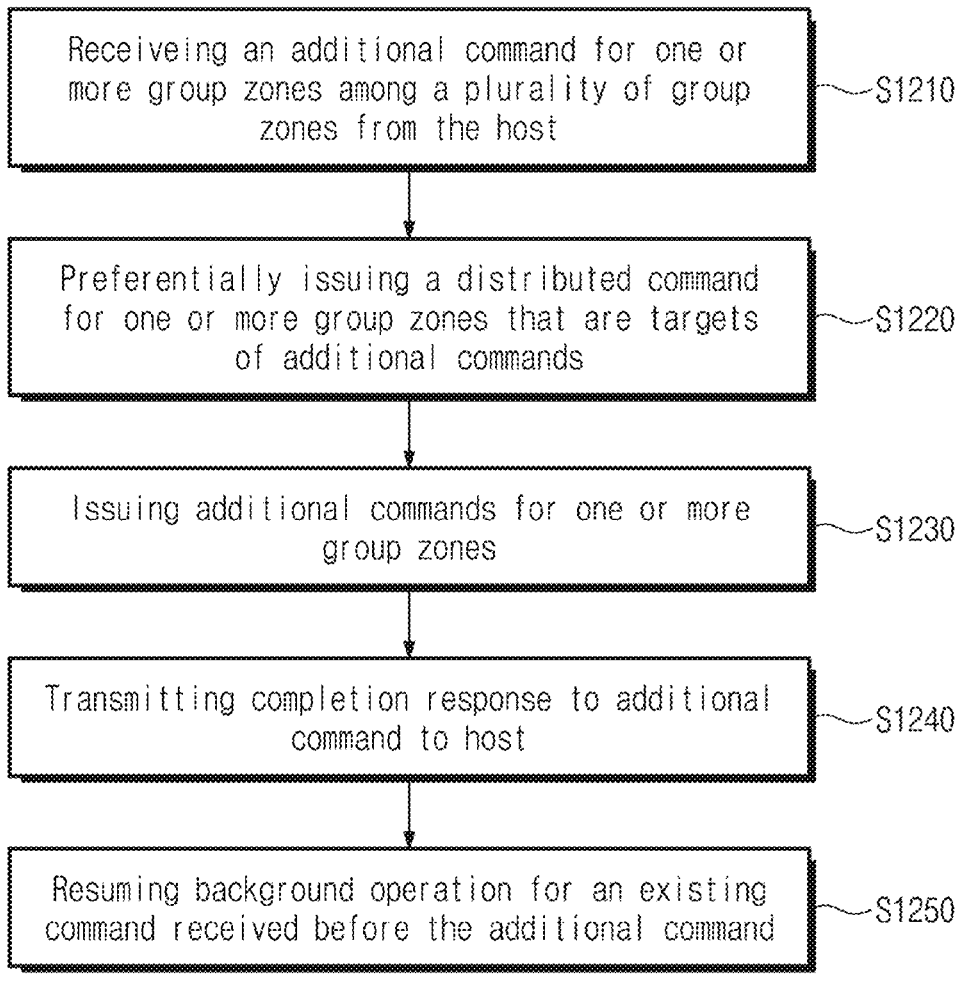

Receiveing an additional command for one or more group zones among a plurality of group zones from the host ——S1210

Preferentially issuing a distributed command for one or more group zones that are targets of additional commands ——S1220

Issuing additional commands for one or more group zones ——S1230

Transmitting completion response to additional command to host ——S1240

Resuming background operation for an existing command received before the additional command ——S1250

ELECTRONIC DEVICE FOR TIMEOUT PREVENTION AND OPERATION METHOD THEREOF

CROSS-REFERENCE TO RELATED APPLICATIONS

This application claims priority under 35 U.S.C. § 119 to Korean Patent Application No. 10-2022-0183539, filed on Dec. 23, 2022, in the Korean Intellectual Property Office, the disclosures of which are incorporated by reference herein in their entireties.

BACKGROUND

Example embodiments of the present disclosure described herein relate to electronic devices, for example, for preventing or reducing timeout, and operation methods thereof.

In a storage device that does not have a large capacity, there is no need to consider a timeout issue since an erase operation in units of blocks can be parallelized and processed quickly. However, in a large-capacity storage device of a petabyte class, for example, a namespace may be defined to include zones of several storage devices. In this case, a command of the host with respect to the namespace needs to be distributed in units of zones. In this case, since distributed commands are issued with respect to all zones, the overhead of command processing increases as the capacity of the storage device increases. For example, when a command with a long processing time, such as an erase operation, is distributed, the delay time may be as long as several seconds to even several minutes.

SUMMARY

Example embodiments of the present disclosure provide electronic devices capable of preventing or reducing timeout by first providing a completion response when a command for a zone in units of volumes is issued and by internally processing distribution commands in a background, and operating methods thereof.

According to some example embodiments, an electronic device may include a processor configured to receive a command requesting an operation for a plurality of group zones from a host, transmit a completion response to the command to the host, and perform a background operation for the command; and a plurality of storage devices, the processor configured to control the plurality of storage devices, each of the plurality of group zones including a plurality of zones included in one or more storage devices among the plurality of storage devices, and the processor being configured to perform the background operation including generating a plurality of distribution commands for each of the plurality of storage devices from the command, and issuing one or more distribution commands among the plurality of distribution commands to one or more storage devices corresponding to the one or more distribution commands, respectively.

According to some example embodiments, a method of operation performed by an electronic device may include receiving a command requesting an operation for a plurality of group zones from a host; transmitting a completion response to the command to the host; and performing a background operation for the command, each of the plurality of group zones including a plurality of zones included in one or more storage devices among a plurality of storage devices, and the background operation including generating a plurality of distribution commands for each of the plurality of storage devices from the command; and issuing one or more distribution commands among the plurality of distribution commands to one or more storage devices corresponding to the one or more distribution commands, respectively.

According to some example embodiments, an electronic device may include a processor configured to receive a command requesting an operation for a plurality of group zones from a host, generate list information for the plurality of group zones, to transmit a completion response to the command to the host, and perform a background operation for the command; and a plurality of storage devices, the processor configured to control the plurality of storage devices, each of the plurality of group zones including a plurality of zones included in one or more storage devices among the plurality of storage devices, the processor configured to perform the background operation including generating a plurality of distribution commands for each of the plurality of storage devices from the command, and issuing one or more distribution commands among the plurality of distribution commands to one or more storage devices corresponding, one or more distribution commands, respectively, and the one or more storage devices among the plurality of storage devices is configured to store the list information in a memory area of the one or more storage devices.

BRIEF DESCRIPTION OF THE FIGURES

A detailed description of each drawing is provided to facilitate a more thorough understanding of the drawings referenced in the detailed description of the present disclosure.

FIG. 2 illustrates zones defined with respect to a storage device, according to some example embodiments of the present disclosure.

FIG. 7 illustrates a flush operation of an electronic device, according to some example embodiments of the present disclosure.

FIG. 12 is a flowchart of an additional command processing method, according to some example embodiments of the present disclosure.

FIG. 14 illustrates a storage system, according to some example embodiments of the present disclosure.

DETAILED DESCRIPTION

Hereinafter, example embodiments of the present disclosure may be described for example and clearly to such an extent that one of ordinary skill in the art may easily implement the present disclosure.

Figure 1:
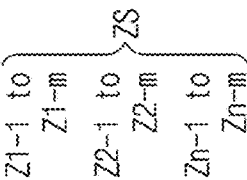
FIG. 1 illustrates an electronic device, according to some example embodiments of the present disclosure.

FIG. 1 illustrates an electronic device according to some example embodiments of the present disclosure.

Referring to FIG. 1, an electronic device 100 according to some example embodiments may include a processor 110 and a plurality of storage devices 121, 122, and 123.

The electronic device 100 may be implemented as, for example, a server, a data center, a personal computer (PC), a network-attached storage, an Internet of Things (IoT) device, and/or a portable electronic device. Portable electronic devices may include laptop computers, mobile phones, smart phones, tablet PCs, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, etc.

The electronic device 100 is connected to the host 10, may receive and process various requests from the host 10, and may transmit responses according to the reception and processing to the host 10. The request may include various commands CMD.

The processor 110 may process the command CMD received from the host 10. The processor 110 may control the plurality of storage devices 121, 122, and 123 to process the command CMD.

The plurality of storage devices 121, 122, and 123 may be controlled by the processor 110. The plurality of storage devices 121, 122, and 123 may perform operations according to the command CMD received from the host 10 under the control of the processor 110. For example, the command CMD may indicate a write operation, a read operation, an erase operation, or a flush operation. In this case, the flush operation may refer to an operation requesting to make data in a volatile write cache non-volatile.

In some example embodiments, when a zone ZS is supported for the plurality of storage devices 121, 122, and 123, the command CMD may include an action command. For example, the action command may include one or more of a close command, a finish command, an open command, a reset command, and/or an offline command. The close command may close one or more zones, the finish command may finish one or more zones, the open command may open one or more zones, the reset command may reset one or more zones, and the offline command may convert one or more zones into an offline state.

Each command CMD may include logical address information associated with a non-volatile memory included in the storage devices 121, 122, and 123 in which an operation according to the command CMD is performed. When a plurality of commands CMD are transmitted from the host 10, logical addresses of the commands CMD may be sequential or random. In some example embodiments, operations according to the command CMD may be sequentially performed in the zone ZS included in the plurality of storage devices 121, 122, and 123.

In some example embodiments, each of the storage devices 121, 122, and 123 may be an SSD, a UFS, or an eMMC. Alternatively, in some example embodiments, each of the storage devices 121, 122, and 123 may be implemented with a secure digital (SD) card, a micro SD card, a memory stick, a chip card, or a universal serial bus (USB) card, a smart card, a compact flash (CF) card, and/or a form similar thereto, and is not limited to the above-described example embodiments.

In some example embodiments, each of the storage devices 121, 122, and 123 may be implemented as 3.5 inches, 2.5 inches, 1.8 inches, M.2, U.2, U.3, EDSFF (Enterprise and Data Center SSD Form Factor), NF1 (New Form Factor 1), and/or form factors similar thereto.

In some example embodiments, each of the storage devices 121, 122, and 123 may be implemented as a small computer system interface (SATA), a small computer system interface (SCSI), a serial attached SCSI (SAS), and/or interfaces similar thereto, and may be implemented as a peripheral component interconnect (PCI), a PCI express (PCIe), a nonvolatile memory express (NVMe), an NVMe-over-Fabrics (NVMe-oF), an Ethernet, an InfiniBand, a Fiber Channel, and/or protocols similar thereto.

In some example embodiments, the zone ZS may be defined in each of the plurality of storage devices 121, 122, and 123. The zone ZS may be defined as including a plurality of logical addresses (e.g., logical block addresses (LBA)) defined with respect to memories (e.g., non-volatile memories) included in the plurality of storage devices 121, 122, and 123. Each of the plurality of storage devices 121, 122, and 123 may include a plurality of zones ZS, and the plurality of zones ZS may be configured to be continuous and non-overlapping with each other.

For example, the plurality of zones ZS may have the same size or different sizes. The size and number of the plurality of zones ZS may be defined for each of the plurality of storage devices 121, 122, and 123, for example, the plurality of zones ZS may be defined separately for each of the plurality of storage devices 121, 122, and 123.

In some example embodiments, group zones GZ0, GZ1, and GZm-1, which are large zones including the plurality of zones ZS described above, may be defined. A plurality of group zones GZ0, GZ1, and GZm-1 may be defined. Each of the plurality of group zones GZ0, GZ1, and GZm-1 may include a plurality of zones ZS included in one or more storage devices among the plurality of storage devices 121, 122, and 123. For example, each of the group zones GZ0, GZ1, and GZm-1 may be defined as including the plurality of zones ZS included in one or more storage devices, unlike the zone ZS that may be defined for each one storage device. One of the group zones GZ0, GZ1, and GZm-1 may be defined only for some of the storage devices 121, 122, and 123 as well as all of the plurality of storage devices 121, 122, and 123 included in the electronic device 100.

For example, the first group zone GZ0 may include a 1-1 zone Z1-1 included in the first storage device 121, and a 2-1 zone Z2-1 included in the second storage device 122 to a n-1 zone Zn-1 included in the k-th storage device 123. For convenience, each of the 1-1 zone Z1-1, the 2-1 zone Z2-1, and the n-1 zone Zn-1 is illustrated as including four zones, however, the present disclosure is not limited thereto. Alternatively, each of the group zones GZ0, GZ1, and GZm-1 may be defined as zones included in some storage devices among the first storage device 121 to the n-th storage device 123.

The aforementioned group zones GZ0, GZ1, and GZm-1 may be defined as zones ZS managed from the perspective of the host 10. For example, the host 10 may request the electronic device 100 to process the command CMD in units of group zones GZ0, GZ1, and GZm-1. Accordingly, from the perspective of the host 10, the plurality of storage devices 121, 122, and 123 in which a plurality of group zones GZ0, GZ1, and GZm-1 can be defined may be managed as one storage device. Therefore, according to some example embodiments of the present disclosure, the group zones GZ0, GZ1, and GZm-1 defined as including the plurality of zones ZS may be exposed to the host 10.

In some example embodiments, the plurality of group zones GZ0, GZ1, and GZm-1 may be defined as one namespace or a zone namespace ZNS. The namespace is a set of the plurality of zones ZS or the group zones GZ0, GZ1, and GZm-1, and may be a processing unit seen by the host 10. For example, the ZNS may be defined as a namespace associated with a ZNS command CMD among namespaces. Also, in the present disclosure, a namespace including a plurality of group zones GZ0, GZ1, and GZm-1 may be referred to as a multi-namespace or a volume namespace.

In some example embodiments, one namespace may be defined for each of the plurality of storage devices 121, 122, and 123, but is not limited thereto.

Since the host 10 may manage the storage devices 121, 122, and 123 in units of namespaces including the plurality of group zones GZ0, GZ1, and GZm-1, according to some example embodiments of the present disclosure, multi-volume management may be provided.

Hereinafter, an operation of the processor 110 for the plurality of group zones GZ0, GZ1, and GZm-1 will be described.

In some example embodiments, the command CMD requesting an operation for a namespace including the plurality of group zones GZ0, GZ1, and GZm-1 or a plurality of group zones GZ0, GZ1, and GZm-1 from the host 10 may be issued.

When the electronic device 100 receives one issued command CMD, the processor 110 may immediately (for example, instantly after, soon thereafter, or as the next action) transmit a completion response Resp to the host 10, firstly. The host 10 may determine that the issued command CMD is completely processed by receiving the completion response Resp, and accordingly, may perform a desired subsequent operation. In some example embodiments, the processor 110 may transmit the completion response Resp in a state in which distribution commands DCMD1, DCMD2, and DCMDn associated with one command CMD are not issued to the storage devices 121, 122, and 123, that is, before the command CMD is processed.

After transmitting the completion response Resp, the processor 110 may incrementally process the command CMD internally, which is completely processed, at least from the perspective of the host 10. In some example embodiments, the processor 110 may perform the incremental processing of the command CMD through a background (BG) operation. The background operation may include generating the plurality of distribution commands DCMD1, DCMD2, and DCMDn for each of the plurality of storage devices 121, 122, and 123 from the command CMD, and issuing one or more distribution commands among the plurality of distribution commands DCMD1, DCMD2, and DCMDn to one or more storage devices corresponding to the one or more distribution commands.

For example, the processor 110 may first distribute one command CMD received from the host 10 with respect to individual zones included in the plurality of storage devices 121, 122, and 123. The processor 110 may generate the plurality of distribution commands DCMD1, DCMD2, and DCMDn from one command CMD. For example, the distribution commands DCMD1, DCMD2, and DCMDn may correspond to zones included in each of the storage devices 121, 122, and 123 included in the plurality of group zones GZ0, GZ1, and GZm-1.

In some example embodiments, the processor 110 may periodically issue the distribution commands DCMD1, DCMD2, and DCMDn. For example, the processor 110 may issue one or more distribution commands to one or more storage devices at predetermined (or, alternatively, selected, or desired) periods.

In this case, the processor 110 may issue the distribution commands DCMD1, DCMD2, and DCMDn in periods that do not affect the performance of the electronic device 100. In some example embodiments, the processor 110 may throttle an issuance period of the distribution commands DCMD1, DCMD2, and DCMDn depending on the performance of the electronic device 100 and an input/output pattern of the host 10. For example, the processor 110 may perform a background operation, that is, issuing the distribution commands DCMD1, DCMD2, and DCMDn relatively more in an idle time than in a non-idle time. This may be that the processor 110 sets the issuance period of the distribution commands DCMD1, DCMD2, and DCMDn to be shorter in the idle time. The idle time may be defined as, for example, a period in which the processor 110 does not receive an input/output command CMD from the host 10 for a specific time.

In contrast, as many input/output commands (CMD) are issued from the host 10, the processor 110 may reduce or stop the background operation in a period where the input/output throughput is high. This may be that the processor 110 sets the issuance period of the distribution commands DCMD1, DCMD2, and DCMDn to be longer in a period with high input/output throughput.

When the host 10 manages the zones ZS included in each of the plurality of storage devices 121, 122, and 123 as the group zones GZ0, GZ1, and GZm-1 of a larger unit, one command CMD issued by the host 10 may be requesting operation processing for a considerable number of group zones (e.g., all group zones GZ0, GZ1, and GZm-1 included in the namespace). As described above, the corresponding command CMD may be distributed as commands CMD for individual zones included in each storage device 121, 122, and 123. From the perspective of the storage devices 121, 122, and 123, the command CMD requesting processing of all included zones ZS is not issued, but actually, since the distribution commands are issued for each of the zones ZS that may exist in a distributed manner, the processing speed thereof is slowed down. Such overhead increases more as the capacity of the storage system increases. In addition, when a command requires (or, for example, instructions, etc.) an erase operation such as a reset, overhead may further increase.

According to the above-described example embodiments of the present disclosure, upon receiving the command CMD for the plurality of group zones GZ0, GZ1, and GZm-1, first provides the completion response Resp to the host 10 before processing the command CMD, and may incrementally perform operations of distributing the command CMD and processing the distribution commands DCMD1, DCMD2, and DCMDn as the background operation after transmitting the completion response Resp. Accordingly, the present disclosure may internally process the command CMD operation while preventing or reducing the occurrence of the timeout due to overhead according to distributed command processing. As such, the electronic device 100 may have improved performance, such as improved power usage, improved processing time, improved effective life of components, more accurate read/write operations, etc.

In addition, since the present disclosure may throttle the issuance period of the distribution commands DCMD1, DCMD2, and DCMDn in consideration of the performance of the electronic device 100 during the background operation processing, the present disclosure may process the background operation while minimizing or reducing an effect on the performance of the electronic device 100. As such, the electronic device 100 may have improved performance, for example, in relation to processing the commands CMD, such as improved power usage, improved processing time, improved effective life of components, more accurate read/write operations, etc.

Figure 2:
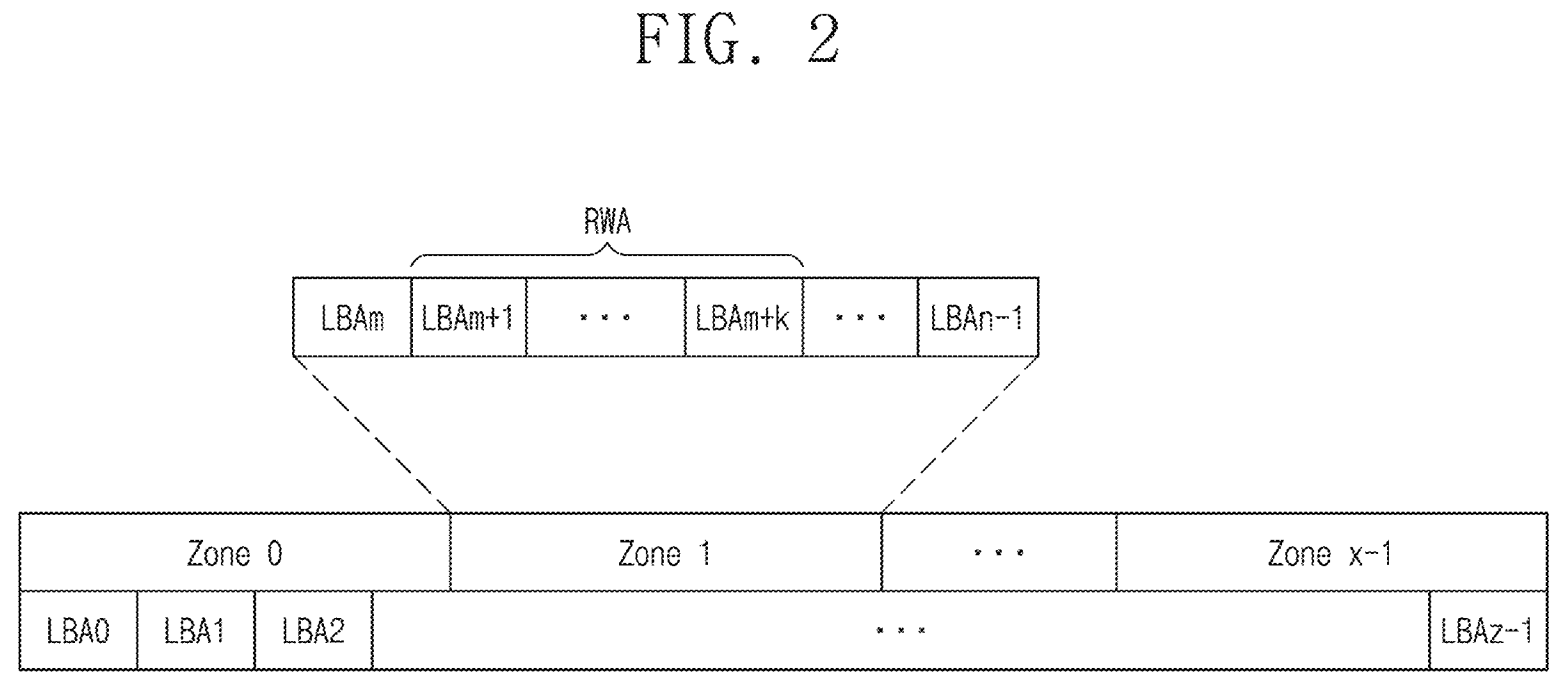

FIG. 2 illustrates zones defined with respect to a storage device, according to some example embodiments of the present disclosure.

Referring to FIG. 2, x zones (Zone0, Zone1, . . . , Zonex-1) (where 'x' is a natural number) may be included in each of the storage device 121, 122, and 123. Each zone may include a plurality of logical addresses, for example, as illustrates, may include a plurality of LBAs (LBA0, LBA1, LBA2, . . . , LBAz-1).

Taking one zone (Zone1), in some example embodiments, one zone (Zone1) may include LBAm to LBAn-1 among LBAs (LBA0, LBA1, LBA2, . . . , LBAz-1) included in all 'x' zones. Each zone may have the same size or a different size. When they have the same size, all zones may have as many sizes as the number of LBAs included in LBAm to LBAn-1.

Each zone may be defined by a ZSLBA (Zone Start Logical Block Address), which is the first storage location, and a ZCAP (Zone Capacity), which is the maximum number of logical blocks that may be included in each zone. For example, as illustrated, the ZSLBA of Zone0 may be LBA0. The ZCAP of Zone1 may be the number of LBAs included in LBAm to LBAn-1.

The zones illustrated in FIG. 2 may be defined by being included in the aforementioned group zones GZ0, GZ1, and GZm-1. Unlike the zones defined for each storage device 121, 122, and 123, the group zones GZ0, GZ1, and GZm-1 may be defined encompassing the plurality of storage devices 121, 122, and 123.

Figure 3A:
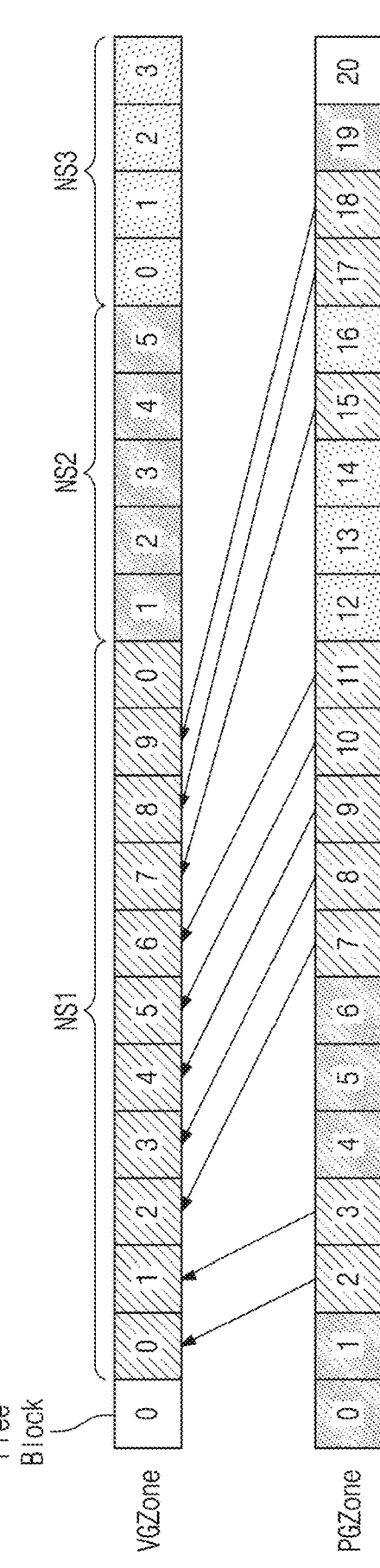
FIG. 3A illustrates an example of a namespace defined with respect to a storage device, according to some example embodiments of the present disclosure.

FIG. 3A illustrates an example of a namespace defined with respect to a storage device, according to some example embodiments of the present disclosure.

Referring to FIG. 3A, when the group zones GZ0, GZ1, and GZm-1 are defined with respect to the storage devices 121, 122, and 123, the namespace may be defined as including the plurality of group zones GZ0, GZ1, and GZm-1. The group zones GZ0, GZ1, and GZm-1 may include a virtual group zone VGZone defined and managed virtually from the perspective of the host 10 and a physical group zone PGZone corresponding to the physical location of the memory included in the storage devices 121, 122, and 123. Then, from the perspective of the host 10, the namespace may be defined as including a plurality of contiguous virtual group zones VGZone. For example, as illustrated, except for a free block, some of the plurality of virtual group zones VGZone may be defined as a first namespace NS1, another some of the plurality of virtual group zones VGZone may be defined as a second namespace NS2, and another some of the plurality of virtual group zones VGZone may be defined as the third name space NS3.

From the perspective of the host 10, one namespace is a set of contiguous virtual group zones VGZone, but physical group zones PGZone actually corresponding to one namespace may or may not be contiguous. For example, the actual physical group zones PGZones (indexes of 2, 3, 7 to 11, 15, 17, and 18) corresponding to the virtual group zone VGZone (indexes of 0 to 9) included in the first namespace NS1 may be provided continuously as illustrated, or may be provided not continuously, (for example, as discreet spaces, or disordered spaces). As such, since there is no guarantee that the actual physical group zones PGZones are continuous, the electronic device 100 may have difficulty processing an operation according to the command CMD using only one command CMD received from the host 10.

In addition, as described above, when one command for the physical group zone PGZone is issued in the form of a distribution command to the zones included in the physical group zone PGZone, as the number of physical group zones PGZone increases, the overhead (for example, storage and/or processing resources/power related to the tracking and usage of the distribution command(s)) may increase and the timeout may be likely to occur.

Figure 3B:
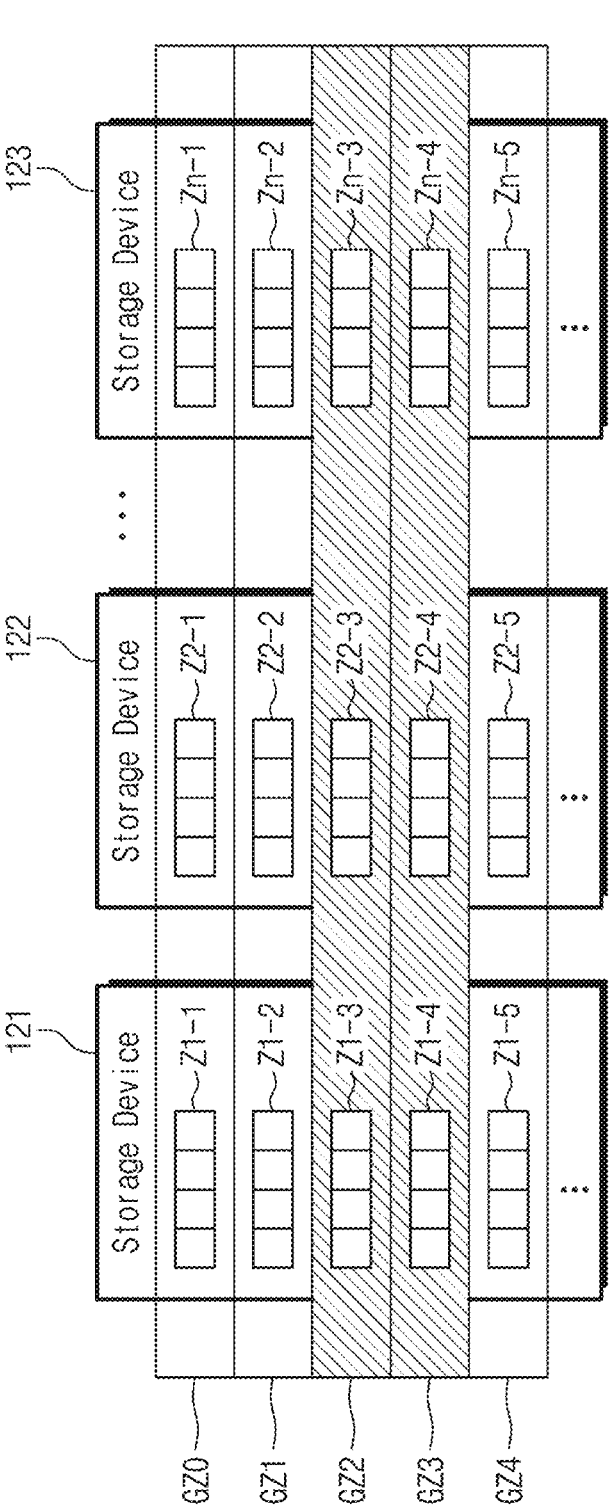
FIG. 3B illustrates a mapping relationship between a namespace according to some example embodiments of FIG. 3A and a storage device.

FIG. 3B illustrates a mapping relationship between a namespace according to some example embodiments of FIG. 3A and a storage device.

The group zones GZ0 to GZ4 of FIG. 3B may correspond to the aforementioned physical group zone PGZone, for example. As illustrated, the group zones GZ0 to GZ4 may be defined over the plurality of storage devices 121, 122, and 123 as well as one storage device.

For example, when the processor 110 receives the command CMD for the plurality of physical group zones PGZone (indexes of 2, 3, 7 to 11, 15, 17, and 18) included in the first namespace NS1, the processor 110 should process the command CMD with respect to all storage devices 121, 122, and 123 and all zones Z1-3, Z1-4, Z2-3, Z2-4, Zn-3, and Zn-4 included in the group zones (GZ2, GZ3, etc.) corresponding to each index. For example, since the group zones GZ0 to GZ4 do not correspond only to one storage device, it is difficult for the processor 110 to process the requested action of the host 10 with only one command CMD.

Figure 4:
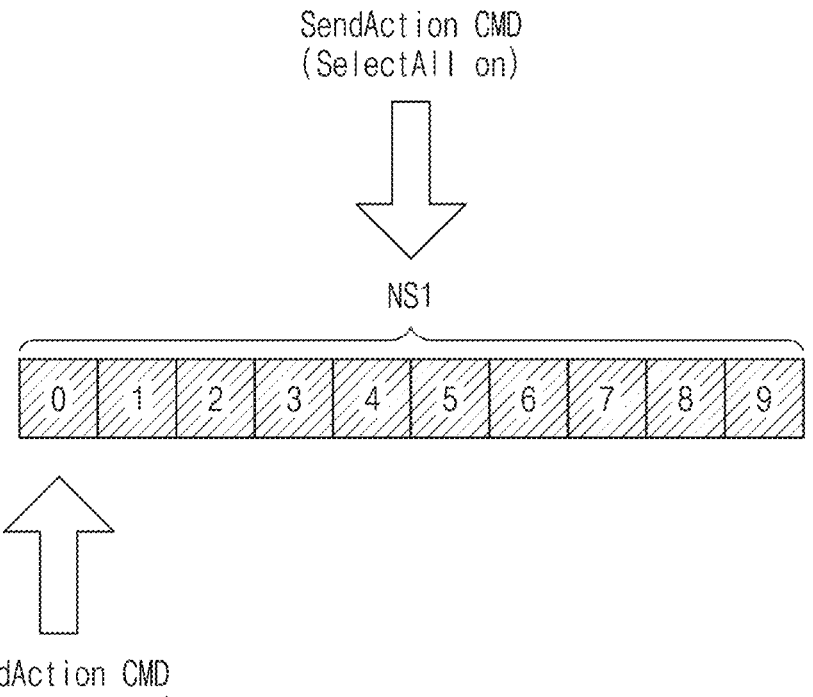
FIG. 4 illustrates an example of a processing target group zone according to a command, according to some example embodiments of the present disclosure.

FIG. 4 illustrates an example of a processing target group zone according to a command, according to some example embodiments of the present disclosure.

Referring to FIG. 4, in some example embodiments, the host 10 may issue a management command requesting a specific action for one or more zones. The management command may include an action command 'SendAction CMD' as described above. The actions may include the aforementioned closing, finishing, opening, resetting, and/or off-line actions.

The management command may specify the lowest LBA of the zone ZS in which the action is to be performed with respect to the action command.

An option 'SelectAll' for selecting all zones ZS for the action command may be supported. When all zones ZS are selected, specifying the lowest LBA of the zone ZS described above is ignored, and the action requested by the host 10 with respect to all zones ZS included in the namespace may be processed.

For example, as illustrated, when the host 10 issues the command CMD for one or more namespaces, the host 10 may issue the command CMD for all group zones (indexes of 0 to 9) included in the namespace by turning on the option 'SelectAll' for selecting all zones ZS, or may issue the command CMD for some group zones (index 0) by turning off the option 'SelectAll' for selecting all zones ZS. In this case, when the group zones GZ0, GZ1, and GZm-1 are supported according to some example embodiments of the present disclosure, the zone ZS in which the option 'SelectAll' for selecting all zones ZS is turned on/off from the perspective of the host 10 may soon be the group zone GZ0, GZ1, and GZm-1.

In this case, since there is no guarantee that the actual physical group zones PGZone are continuous as illustrated in FIG. 3A, when the option 'SelectAll' is turned on, the electronic device 100 may issue the distribution command DCMD1, DCMD2, and DCMDn with respect to all group zones GZ0, GZ1, and GZm-1 included in the namespace and all zones ZS included in each of the group zones GZ0, GZ1, and GZm-1.

For example, in the case of a reset that needs to be erased among the above-described action commands, when the distribution commands DCMD1, DCMD2, and DCMDn are issued with respect to all group zones GZ0, GZ1, and GZm-1, there is a high possibility that a timeout will occur. Therefore, when the electronic device 100 according to some example embodiments receives a management command in which the option 'SelectAll' is turned on and the action command is reset, the electronic device 100 may first transmit the completion response Resp and then may process the distribution command DCMD1, DCMD2, DCMDn with the background operation. As such, the electronic device 100 may have improved performance, such as improved power usage, improved processing time, improved effective life of components, more accurate read/write operations, etc.

Alternatively, in addition, when the electronic device 100 receives a plurality of commands CMD requesting an action for the group zones GZ0, GZ1, and GZm-1, the electronic device 100 may first transmit the completion response Resp and then may process the distribution command DCMD1, DCMD2, DCMDn with the background operation.

Figure 5:
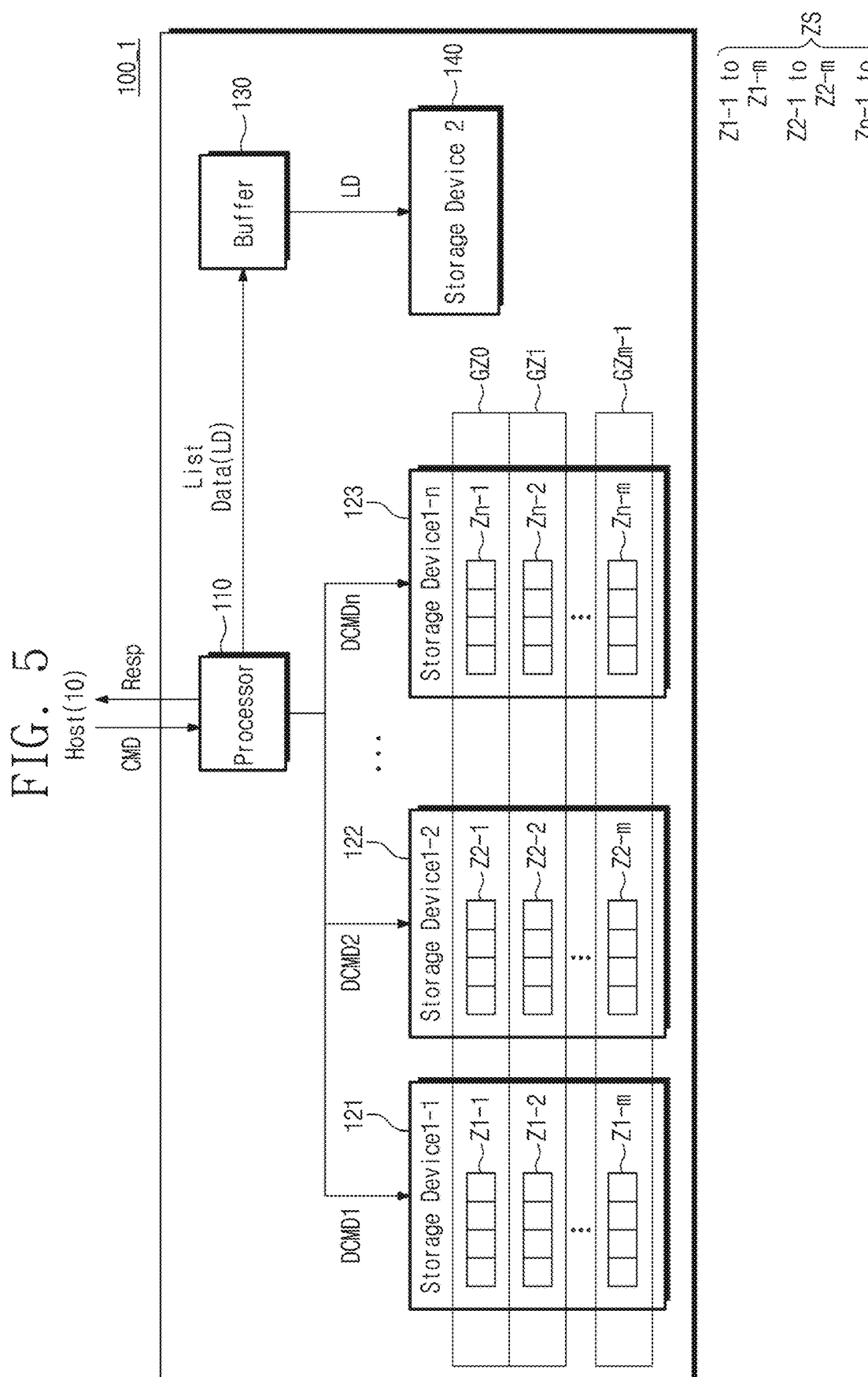
FIG. 5 illustrates an electronic device, according to some example embodiments of the present disclosure.

FIG. 5 illustrates an electronic device, according to some example embodiments of the present disclosure.

Referring to FIG. 5, an electronic device 100_1 according to some example embodiments may further include a buffer 130 and one or more other storage devices 140 in addition to the processor 110 and the plurality of storage devices 121, 122, and 123 of FIG. 1.

In some example embodiments, when the processor 110 receives the command CMD requesting an action for the plurality of group zones GZ0, GZ1, and GZm-1 from the host 10, the processor 110 may generate list information LD associated with the plurality of group zones GZ0, GZ1, and GZm-1. The list information LD is a list of group zones for which the host 10 requests an action. For example, when the option 'SelectAll' is turned on in the management command, the list information LD may include all group zones GZ0, GZ1, and GZm-1 included in the namespace. The processor 110 may generate list information LD before transmitting the completion response Resp to the host 10.

In some example embodiments, the processor 110, upon receiving the command CMD, may determine whether the command CMD may be processed, and when it is not necessary to transmit an error response, the processor 110 may generate the list information LD. For example, the processor 110, when receiving the command CMD in which the option 'SelectAll' is turned on, may determine whether a processable condition exists and may generate the list information LD unless an error response needs to be transmitted.

The processor 110 may store the generated list information LD in the buffer 130.

The buffer 130 may store the list information LD generated by the processor 110. For example, the buffer 130 may be a volatile memory such as a dynamic random-access memory (DRAM) or a static random-access memory (SRAM).

The processor 110 may store the list information LD in the one or more other storage devices 140 to prevent or reduce loss of the list information LD when a power loss situation such as a sudden power-off (SPO) occurs. The processor 110 may flush the list information LD stored in the buffer 130 to the one or more other storage devices 140.

The one or more other storage devices 140 may store the list information LD transferred from the processor 110. The one or more other storage devices 140 may be provided in the electronic device 100_1 separately from the plurality of storage devices 121, 122, and 123 described above. The zone ZS may be supported or may not be supported for the one or more other storage devices 140.

The buffer 130 and/or the one or more other storage devices 140 may store, in addition to the list information LD, various metadata required (or, for example, beneficial or optional) for the electronic device 100_1 to incrementally process the command CMD.

Even if power of the electronic device 100_1 is suddenly lost, the processor 110 may immediately (for example, instantly after, soon thereafter, or as the next action) obtain the metadata and the list information LD stored in one or more other storage devices 140 when the power is restored later.

Figure 6:
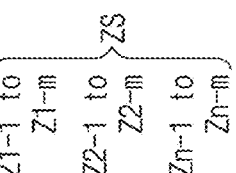
FIG. 6 illustrates an electronic device, according to some example embodiments of the present disclosure.

FIG. 6 is a diagram illustrating an electronic device, according to some example embodiments of the present disclosure.

Referring to FIG. 6, an electronic device 100_2 according to some example embodiments, instead of separately including one or more other storage devices 140 of FIG. 5, may include a memory area 150 for storing the metadata in one or more storage devices among the plurality of storage devices 121, 122, and 123.

In such case, the processor 110 may flush the metadata stored in the buffer 130 to the memory area 150 to prepare for power loss. The zone ZS may be supported or may not be supported for the memory area 150.

Alternatively, the processor 110 may directly store the metadata in the memory area 150.

According to the above-described example embodiments, when the background operation is performed based on the distribution command, since the present disclosure may generate and store the list information LD including group zones GZ0, GZ1, and GZm-1 that are subject to the background operation, it is possible to prepare for power loss situations such as the SPO. As such, an operation of the electronic device 100_2 may be improved, for example, by allowing interrupted operations to continue)

In some example embodiments, the processor 110 may update the list information LD when group zones GZ0, GZ1, and GZm-1 that are processed according to the background operation occur. For example, the processor 110 may update the list information LD when one or more group zones processed based on the background operation exist among the plurality of group zones GZ0, GZ1, and GZm-1. The processor 110 may store the updated list information LD in the buffer 130.

FIG. 7 illustrates a flush operation of an electronic device, according to some example embodiments of the present disclosure.

Referring to FIG. 7, in some example embodiments, when the number of one or more group zones processed is greater than or equal to a preset (or, alternatively, selected, or desired, or threshold) number, that is, when the background operation for the preset (or, alternatively, selected, or desired) processing range is completed, the processor 110 may store the updated list information LD in one or more other storage devices 140 and/or the memory area 150 as described above. When the list information LD is updated whenever the group zones GZ0, GZ1, and GZm-1 processed through the background operation occur, the overhead of the electronic devices 100, 100_1, and 100_2 may increase. Accordingly, the processor 110 may store the updated list information LD only when a specific number of group zones are processed. This may mean that the flush operation of the updated list information LD stored in the buffer 130 is performed only when a specific number of group zones are processed.

For example, as illustrated, in some example embodiments in which updated list information LD is flushed whenever 4 group zones are processed may be considered. A state of the list information LD stored in the buffer 130 may be flushed to one or more other storage devices 140 or the memory area 150 in units of the first range 'range0' and the second range 'range1'. The updating of the group zones GZ0 to GZ1 included in the first range 'range0' and the flushing thereof are completed at a first flush timing FT1. However, the group zones GZ4 and GZ5 among the group zones GZ4 to GZ7 included in the second range 'range1' are, additionally, actually processed and the list information LD thereof is updated, but the subsequent flush timing, that is, a second flush timing FT2, has not yet arrived. Therefore, the list information LD may still not be updated in the other storage device 140 or the memory area 150.

According to some example embodiments, since the list information LD is not stored every time it is updated, when power loss such as the SPO occurs, information associated with the group zone that has already been processed in the list information LD may be lost. As such, in some example embodiments, when power loss occurs after the processing of GZ5 in FIG. 7 is completed, even if power is restored and the list information LD is loaded, information associated with, for example, the processing of GZ4 and GZ5 will be lost.

In this case, the host 10 may transmit the command CMD again to the group zone that has already been processed in the subsequent power cycle.

When the existing command CMD is the reset command that requires an erase operation, the host 10 may not redundantly process the command CMD of the host 10 for the group zone that has already been processed through the background operation even if there is information lost in the list information LD. This is because the reset operation cannot be performed redundantly as the group zone is already in an erased state. Accordingly, the command CMD for which the background operation is repeatedly requested may be quickly processed through the electronic devices 100, 100_1, and 100_2, and may not consume a P/E cycle (program/erase cycle). As a result, when the processing operation of the electronic devices 100, 100_1, and 100_2 for the repeatedly requested command CMD is repeated as many periods as flushing the list information LD to one or more other storage devices 140 or the memory area 150, the background operation for the unprocessed group zone may be resumed.

Hereinafter, operating methods of the electronic devices 100, 100_1, and 100_2 according to the above described example embodiments will be described in more detail.

Figure 8:
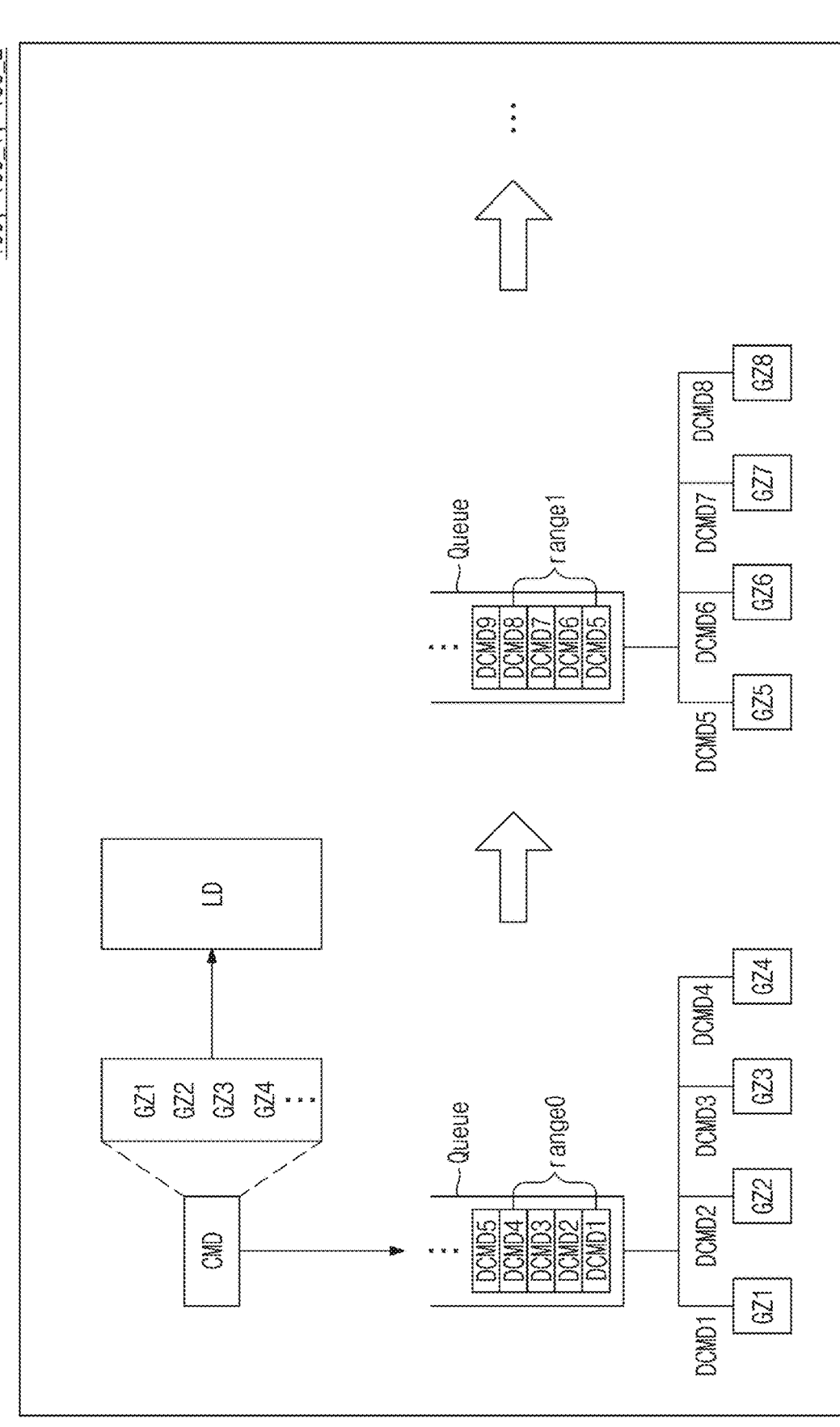
FIG. 8 illustrates a distribution command issuing operation of an electronic device, according to some example embodiments of the present disclosure.

FIG. 8 illustrates a distribution command issuing operation of an electronic device, according to some example embodiments of the present disclosure.

Referring to FIG. 8, when electronic devices 100, 100_1, and 100_2 receive the command CMD requesting an operation for the group zone from the host 10, electronic devices 100, 100_1, and 100_2 may first transmit the completion response Resp to the host 10 and then will perform the background operation. In this case, the electronic devices 100, 100_1, and 100_2 may generate the list information LD including a list of all group zones requested by the command CMD.

After generating the list information LD, the electronic devices 100, 100_1, and 100_2 may generate the distribution command for the group zones included in the list information LD and store it in a separate queue. As described above, the distribution command may correspond to each of the plurality of zones ZS included in the group zone.

The electronic devices 100, 100_1, and 100_2 may respectively issue one or more distribution commands among the generated distribution commands to one or more storage devices at predetermined (or, alternatively, selected, or desired) periods. The electronic devices 100, 100_1, and 100_2 may issue the distribution command in a preset (or, alternatively, selected, or desired) processing range at each preset (or, alternatively, selected, or desired) period. For example, as illustrated, when there are four preset (or, alternatively, selected, or desired) processing ranges, the electronic devices 100, 100_1, and 100_2 may first issue the four distribution commands DCMD1 to DCMD4 from the queue to each of the group zones GZ1 to GZ4 and the storage device respectively corresponding to the group zones GZ1 to GZ4. Thereafter, the electronic devices 100, 100_1, and 100_2 may respectively issue four distribution commands DCMD5 to DCMD8 after the previously issued distribution command to the group zones GZ5 to GZ8 when a preset (or, alternatively, selected, or desired) period arrives.

The electronic devices 100, 100_1, and 100_2 may repeat the above-described background operation until all distribution commands generated from one command CMD received from the host 10 are processed. The processing period of the distribution command may be throttled depending on the performance of the electronic devices 100, 100_1, and 100_2, the input/output pattern of the host 10, and the like according to the above-described example embodiments.

Figure 9:
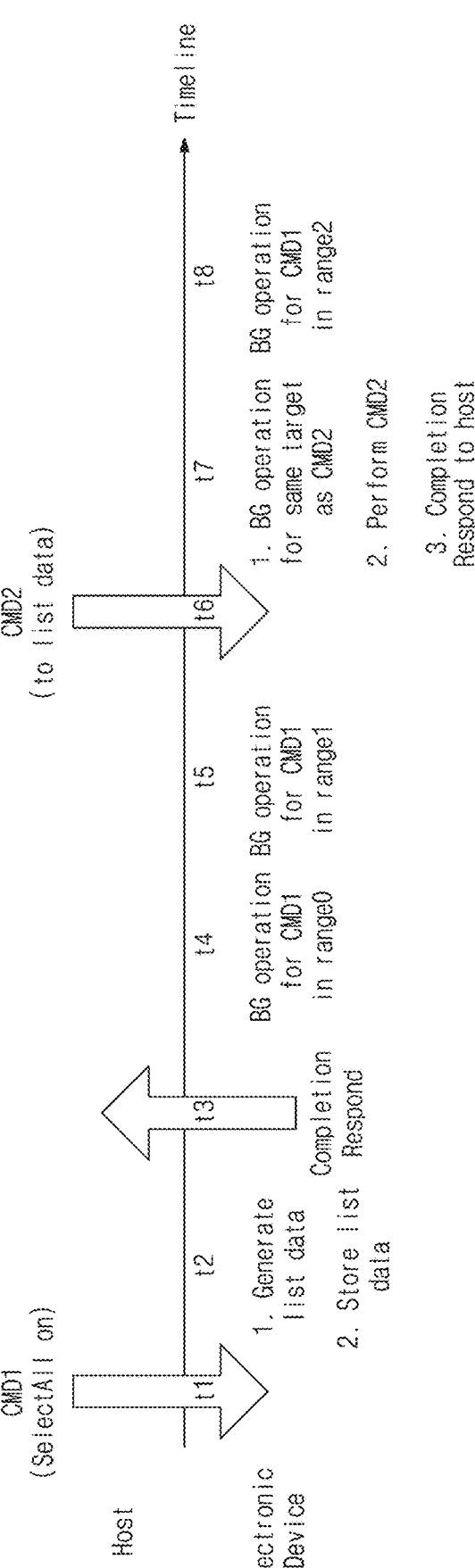
FIG. 9 illustrates an operation of an electronic device, according to some example embodiments of the present disclosure.

FIG. 9 illustrates an operation of an electronic device, according to some example embodiments of the present disclosure.

Referring to FIG. 9, the electronic devices 100, 100_1, and 100_2 may receive a first command CMD1 from the host 10 at time t1. For example, the first command CMD1 may be a command CMD in which the option 'SelectAll' is turned on.

The electronic devices 100, 100_1, and 100_2 may generate list information LD (also referred to as list data) for the plurality of group zones GZ0, GZ1, and GZm-1 that are subject to the first command CMD1 at time t2, and may store the generated list information LD.

The electronic devices 100, 100_1, and 100_2 may transmit the completion response Resp to the host 10 at time t3. The time t3 may be at least a time before the background operation is performed. Upon receiving the completion response Resp, the host 10 may determine that the operation for the first command CMD1 is completely processed and may request a desired subsequent operation.

The electronic devices 100, 100_1, and 100_2 may perform the background operation for the first command CMD1 at time t4. According to some example embodiments, the electronic devices 100, 100_1, and 100_2 may perform the background operation in a preset (or, alternatively, selected, or desired) processing range at each preset (or, alternatively, selected, or desired) period. For example, at time t4, the electronic devices 100, 100_1, and 100_2 may process the action requested by the first command CMD1 with respect to as many group zones as the first range 'range 0' corresponding to a preset (or, alternatively, selected, or desired) processing range among the plurality of group zones GZ0, GZ1, and Gzm-1 included in the list information LD. In addition, the electronic devices 100, 100_1, and 100_2 may process the action requested by the first command CMD1 with respect to as many group zones as the second range 'range 1' corresponding to the preset (or, alternatively, selected, or desired) processing range at time t5 after the preset (or, alternatively, selected, or desired) period elapses.

In this case, since the host 10 receives the completion response Resp as described above, the host 10 may request an additional operation with respect to the plurality of group zones GZ0, GZ1, and GZm-1 included in the list information LD at a time t6. In such case, the electronic devices 100, 100_1, and 100_2 may receive the additional command for one or more group zones among the plurality of group zones GZ0, GZ1, and GZm-1, that is, the second command CMD2, from the host 10. From the perspective of the host 10, the second command CMD2 may be a command for a group zone for which processing has already been completed, that is, from the perspective of the electronic devices 100, 100_1, and 100_2, the second command CMD2 may be a command for the group zones GZ0, GZ1, and Gzm-1 that are subject to the background operation. For example, the group zone that is subject to the second command CMD2 may exist on the list information LD but may not be processed.

In some example embodiments, when the operation of the previous command is guaranteed to be completed, the access of the host 10 according to the subsequent command occurs, so the electronic devices 100, 100_1, and 100_2 may preferentially process (for example, give priority to, queue earlier, etc.) the group zone for the second command CMD2 when accessing according to the second command CMD2 of the host 10 at a time t7. Upon receiving the second command CMD2, the electronic devices 100, 100_1, and 100_2 may preferentially (for example, give priority to, queue earlier, etc.) perform the background operation for the target group zone of the second command CMD2 instead of the background operation for the group zone related to the first command CMD1 in queue to be performed. For example, the electronic devices 100, 100_1, and 100_2 may preferentially (for example, give priority to, queue earlier, etc.) issue the distribution command for one or more group zones that are subject to the second command CMD2. That is, background operations of the second command CMD2 may supersede (or, alternatively, be given priority or preference, etc.) background operations of the first command CMD1 according to some example embodiments.

The electronic devices 100, 100_1, and 100_2 may process the second command CMD2 when processing of the distribution command issued with priority is completed. For example, the processor 110 may issue the second command CMD2 for the one or more group zones when processing of the distribution command for the one or more group zones that are subject to the second command CMD2 is completed. In addition, the electronic devices 100, 100_1, and 100_2 may transmit the completion response Resp associated with the additional command to the host 10.

After the processing of the second command CMD2 is completed, the electronic devices 100, 100_1, and 100_2 may resume the background operation for the first command CMD1 at a time t8. For example, the electronic devices 100, 100_1, and 100_2 may process the action requested by the first command CMD1 with respect to as many group zones as the third range 'range2' corresponding to the preset (or, alternatively, selected, or desired) processing range among the plurality of group zones GZ0, GZ1, and GZm-1 included in the list information LD.

In some example embodiments, after the time t7 passes, one or more group zones included in the list information LD will be in a state in which all of operations according to the first command CMD1 and the second command CMD2 are processed. The electronic devices 100, 100_1, and 100_2 may update the list information LD to a processed state. In this case, when power loss occurs before the updated list information LD is flushed, the background operation according to the first command CMD1 may be processed redundantly even though all of the operations according to the first command CMD1 and the second command CMD2 are processed.

For example, when the first command CMD1 is the reset command and the second command CMD2 is a command (e.g., open, write, etc.) other than the reset command, the corresponding group zone will be reset again when the background operation is duplicated for one or more processed group zones. Accordingly, the electronic devices 100, 100_1, and 100_2 should no longer perform any more background operations with respect to the corresponding group zone.

Accordingly, the electronic devices 100, 100_1, and 100_2 according to some example embodiments may update the list information LD when the processing of the distribution command for one or more group zones that are subject to the second command CMD2, that is, the background operation is completed, and may flush the updated list information LD to one or more other storage devices 140 or the memory area 150.

Figure 10:
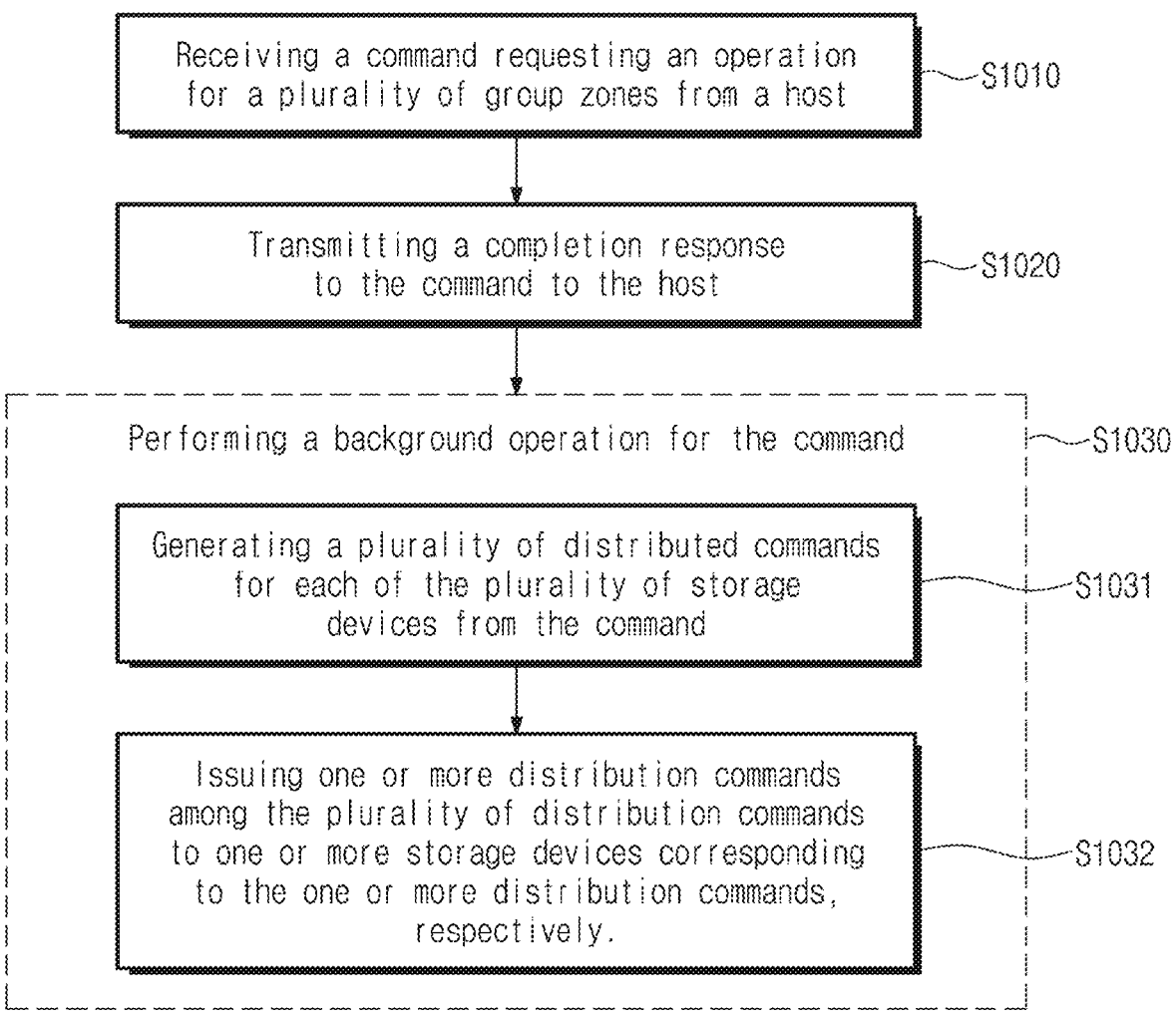
FIG. 10 is a flowchart of an operating method of an electronic device, according to some example embodiments of the present disclosure.

FIG. 10 is a flowchart of an operating method of an electronic device, according to some example embodiments of the present disclosure.

Referring to FIG. 10, in some example embodiments, in S1010, the electronic devices 100, 100_1, and 100_2 may receive the command CMD requesting an operation for the plurality of group zones GZ0, GZ1, and GZm-1 from the host 10. In this case, each of the plurality of group zones GZ0, GZ1, and GZm-1 may include the plurality of zones ZS included in one or more storage devices among the plurality of storage devices 121, 122, and 123.

In S1020, the electronic devices 100, 100_1, and 100_2 may transmit the completion response Resp to (associated with) the command CMD to the host 10. Operation S1020 may be performed in advance before the command CMD is processed by the electronic devices 100, 100_1, and 100_2.

In S1030, the electronic devices 100, 100_1, and 100_2 may perform the background operation for the command CMD. The background operation may include the following operations.

In operation S1031, the electronic devices 100, 100_1, and 100_2 may generate the plurality of distribution commands DCMD1, DCMD2, and DCMDn for each of the plurality of storage devices 121, 122, and 123 from the command CMD based on the list information LD.

In operation S1032, the electronic devices 100, 100_1, and 100_2 may issue one or more distribution commands among the plurality of distribution commands DCMD1, DCMD2, and DCMDn to one or more storage devices corresponding to the one or more distribution commands, respectively. Operation S1032 may be repeatedly performed until operations for all of the plurality of group zones GZ0, GZ1, and GZm-1 included in the list information LD generated with respect to the command CMD are completed. The background operation according to operation S1030 may be performed every preset (or, alternatively, selected, or desired) period.

Figure 11:
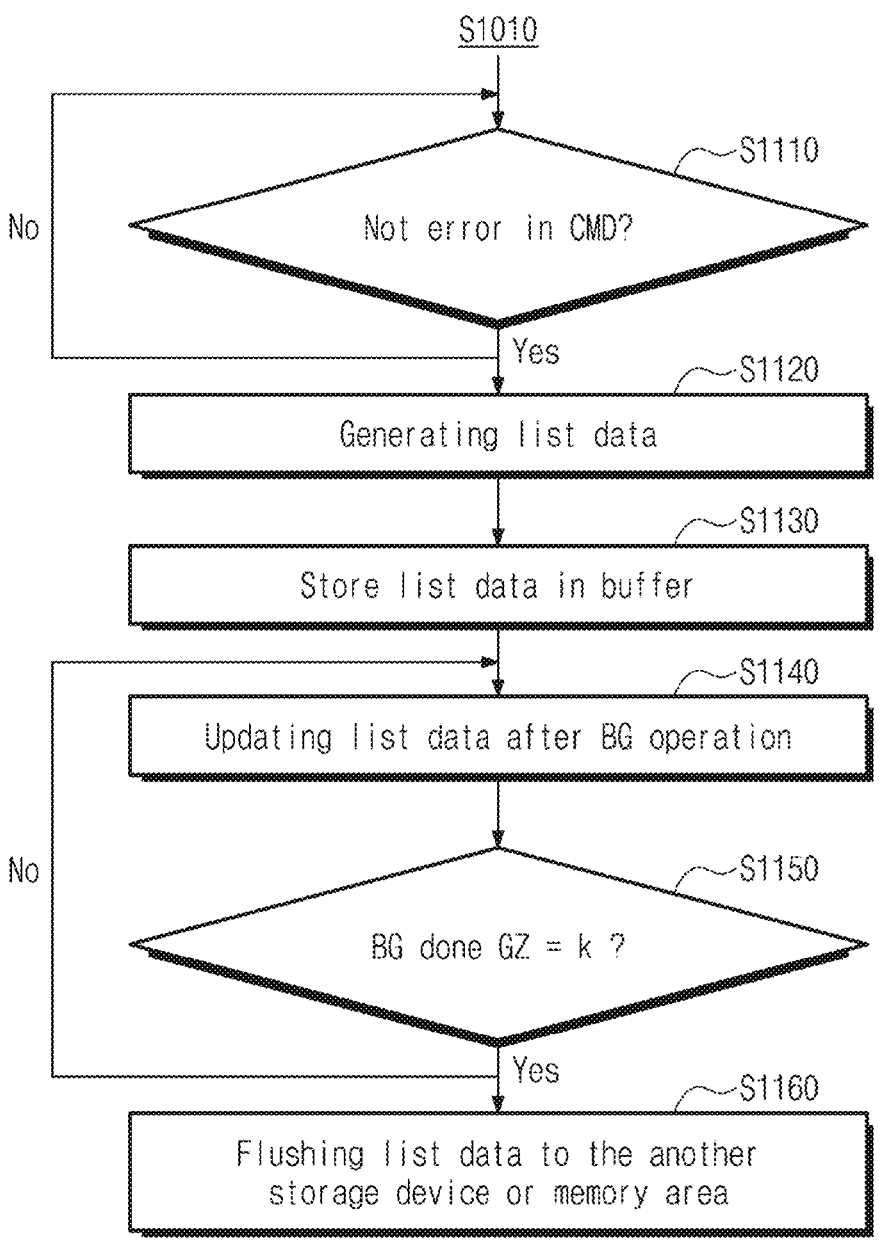
FIG. 11 is a flowchart of a method for generating list information of an electronic device, according to some example embodiments of the present disclosure.

FIG. 11 is a flowchart of a method for generating list information of an electronic device, according to some example embodiments of the present disclosure.

Referring to FIG. 11, after operation S1010 of receiving the command CMD from the host 10, the electronic devices 100, 100_1, and 100_2 may determine whether the command CMD can be processed in operation S1110 and may determine whether or not an error response should be transmitted.

When the command CMD can be processed, the electronic devices 100, 100_1, and 100_2 may generate the list information LD for the plurality of group zones GZ0, GZ1, and GZm-1 in operation S1120.

In operation S1130, the electronic devices 100, 100_1, and 100_2 may store the generated list information LD in the buffer 130 and/or other locations as discussed herein.

In operation S1140, the electronic devices 100, 100_1, and 100_2 may update list information LD after performing the background operation. For example, the electronic devices 100, 100_1, and 100_2 may update the list information LD when one or more group zones have processed the background operation among the plurality of group zones GZ0, GZ1, and GZm-1 as a completed group zone. That is, a background done in relation to group zones (BG done GZ) count may be increased by the number of additionally completed group zones.

In operation S1150, the electronic devices 100, 100_1, and 100_2 may determine whether the number of group zones GZ0, GZ1, and GZm-1 for which the background operation is completed equals a preset (or, alternatively, selected, or desired, or threshold) number ('k', which is a natural number).

When the number of group zones GZ0, GZ1, and GZm-1 for which the background operation is completed is the preset (or, alternatively, selected, or desired, or threshold) number, the electronic devices 100, 100_1, and 100_2 may flush the list information LD stored in the buffer 130 in operation S1160 in the one or more other storage devices 140 or the memory area 150. Therefore, the electronic devices 100, 100_1, and 100_2 may perform flushing of the list information LD only when the group zones GZ0, GZ1, and GZm-1 are processed in a preset (or, alternatively, selected, or desired) processing range, thereby preventing, or reducing excessive overhead. And as such, a performance of the electronic devices 100, 100_1, and 100_2 may be improved, for example, power usage, processing time, and/or life efficiency of electrical components may be improved based on some of the example embodiments of the present disclosure.

FIG. 12 is a flowchart of an additional command processing method, according to some example embodiments of the present disclosure.

Referring to FIG. 12, in some example embodiments, in operation S1210, the electronic devices 100, 100_1, and 100_2 may receive an additional command for the one or more group zones among the plurality of group zones GZ0, GZ1, and Gzm-1 from the host 10 while performing the background operation through operation S1030. For example, the additional command may correspond to the aforementioned second command CMD2. The additional command may be to request the same operation or different operation from the command received by the electronic devices 100, 100_1, and 100_2 through operation S1010 with respect to the group zones GZ0, GZ1, and GZm-1 included in the list information LD.

In operation S1220, the electronic devices 100, 100_1, and 100_2 may preferentially (for example, give priority to, queue earlier, etc.) issue the distribution command for one or more group zones that are targets of the additional commands. In this case, the electronic devices 100, 100_1, and 100_2 may stop the background operation being processed and may prioritize issuance of the distribution command for one or more group zones.

In operation S1230, the electronic devices 100, 100_1, and 100_2 may issue the additional commands for one or more group zones. Accordingly, the additional command may be processed immediately (for example, instantly after, soon thereafter, or as the next action) after processing of the distribution command for a group zone that is not processed.

In operation S1240, the electronic devices 100, 100_1, and 100_2 may transmit the completion response Resp to the additional command to the host 10.

In operation S1250, the electronic devices 100, 100_1, and 100_2 may resume the background operation for an existing command (for example, the first command CMD1) received before the additional command (for example, the second command CMD2).

Figure 13:
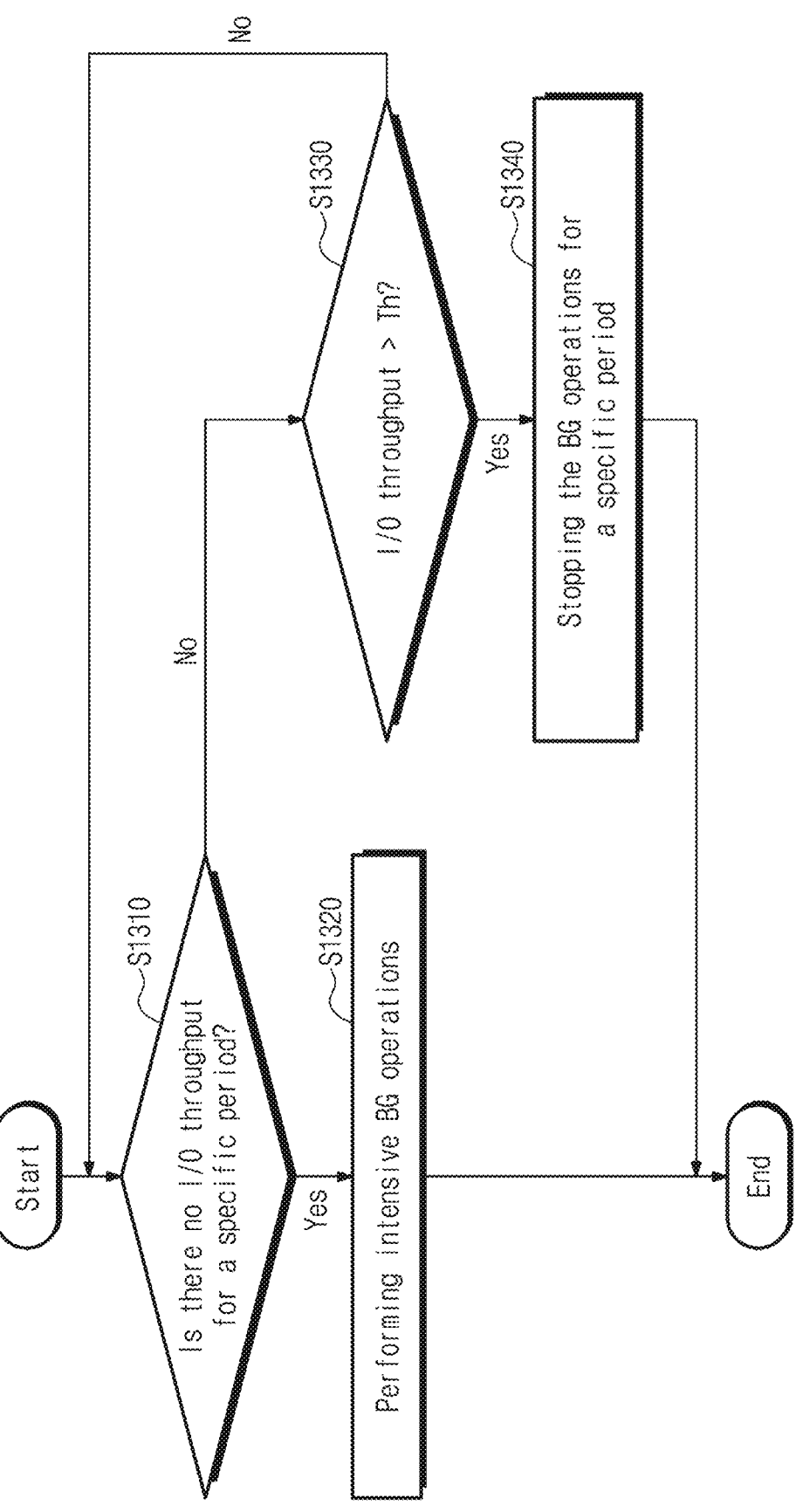
FIG. 13 is a flowchart of a method for setting a period of an electronic device, according to some example embodiments of the present disclosure.

FIG. 13 is a flowchart of a method for setting a period of an electronic device, according to some example embodiments of the present disclosure.

Referring to FIG. 13, in some example embodiments, the electronic devices 100, 100_1, and 100_2 may monitor the input/output throughput from the host 10 in operation S1310, and may determine whether the input/output throughput from the host 10 is absent for a specific period of time.

When there is no input/output throughput for the specific period of time, the electronic devices 100, 100_1, and 100_2 determine that it is an idle time in operation S1320 and may set the issuance period of the distribution commands DCMD1, DCMD2, and DCMDn to be short, thereby intensively (for example, quickly or at a faster pace, etc.) performing background operations. As such, processing resources may be have improved usage in response to commands received after an idle time.

When the input/output throughput continues to exist, the electronic devices 100, 100_1, and 100_2 may determine whether the input/output throughput exceeds a threshold value 'Th' in operation S1330.

When the input/output throughput exceeds the threshold value 'Th', the electronic devices 100, 100_1, and 100_2 may stop the background operations for a specific period in operation S1340. Alternatively, the electronic devices 100, 100_1, and 100_2 may set a long issuance period of the distribution commands DCMD1, DCMD2, and DCMDn for the background operation.

When the input/out throughput does not exceed the threshold value 'Th', the electronic devices 100, 100_1, and 100_2 may repeat operation S1310.

Figure 14:
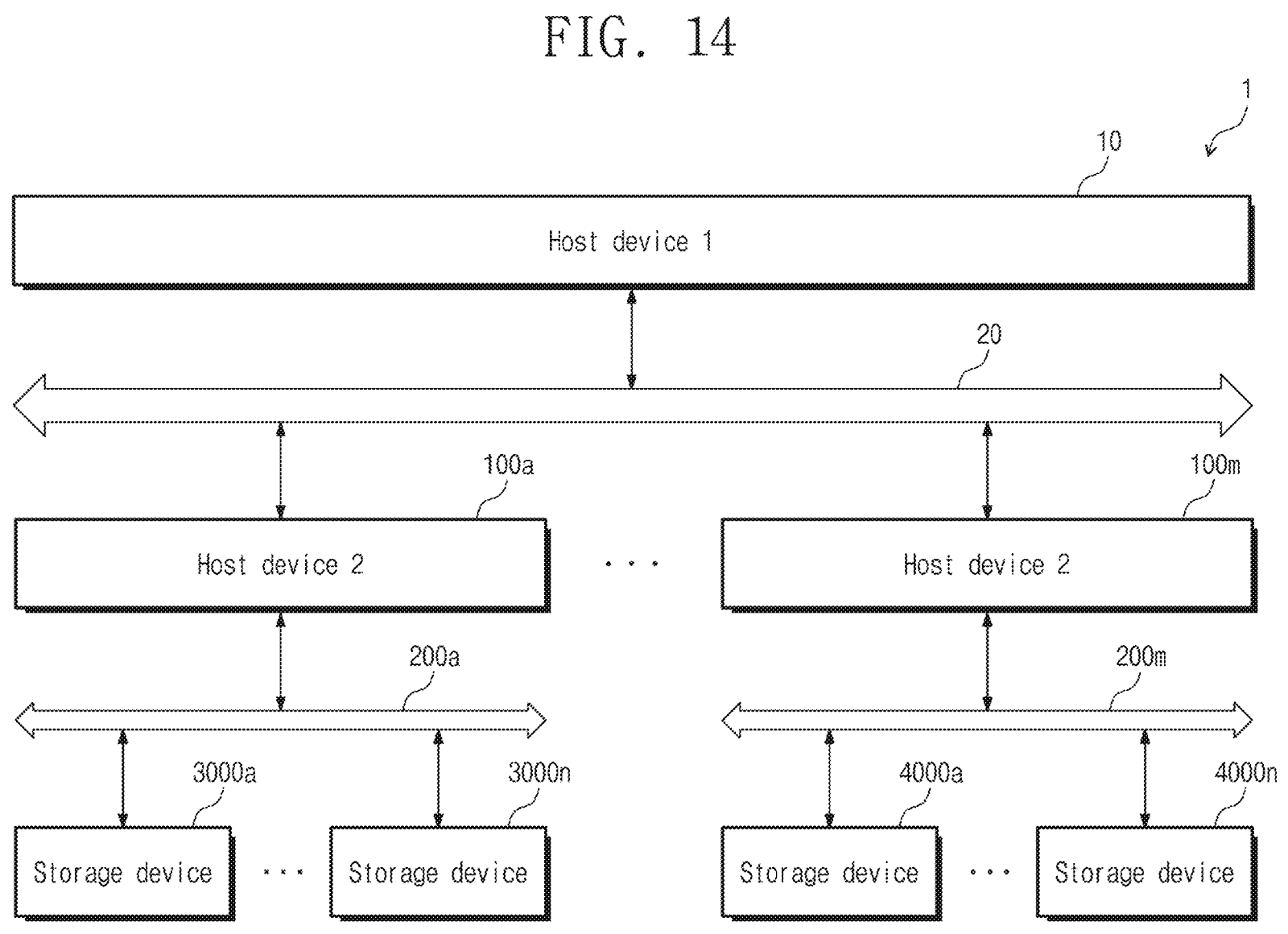

FIG. 14 illustrates a storage system, according to some example embodiments of the present disclosure.

Referring to FIG. 14, a storage system 1 according to some example embodiments may include a first host device 10, a plurality of second host devices 100a to 100m, and a plurality of storage devices 3000a to 3000n, to 4000a to 4000n. Each of the plurality of second host devices 100a to 100m may include a processor included in the electronic devices 100, 100_1, and 100_2 according to some example embodiments as described above.

The first host device 10 controls overall operations of the plurality of second host devices 100a to 100m connected to a first bus 20. For example, the first host device 10 may be a data center. The plurality of second host devices 100a to 100m control overall operations of the plurality of storage devices 3000a to 3000n, to 4000a to 4000n respectively connected to the second host devices 100a to 100m through second buses 200a and 200m. For example, the second host devices 100a to 100m may be servers.

In some example embodiments, each of the plurality of storage devices 3000a to 3000n, to 4000a to 4000n may include the plurality of zones GZ. The zone from the perspective of the first host device 10 and the second host devices 100a to 100m may be the group zones GZ0, GZ1, and Gzm-1 in which the plurality of zones GZ included in the plurality of storage devices 3000a to 3000n, to 4000a to 4000n are grouped. For example, the first host device 10 may request command processing to the second host devices 100a to 100m in units of group zones GZ0, GZ1, and GZm-1. The second host devices 100a to 100m may transmit the completion response Resp to the received command to the first host device 10 and may perform the background operation for the command according to some of the example embodiments described above. For example, as the background operation, the second host devices 100a to 100m may perform generating the plurality of distribution commands DCMD1, DCMD2, and DCMDn for each of the plurality of storage devices 3000a to 3000n, to 4000a to 4000n from the command, and issuing one or more distribution commands DCMD1, DCMD2, and DCMDn among the plurality of distribution commands DCMD1, DCMD2, and DCMDn to one or more storage devices 3000a to 3000n, to 4000a to 4000n corresponding to the one or more distribution commands DCMD1, DCMD2, and DCMDn, respectively.

Figure 15:
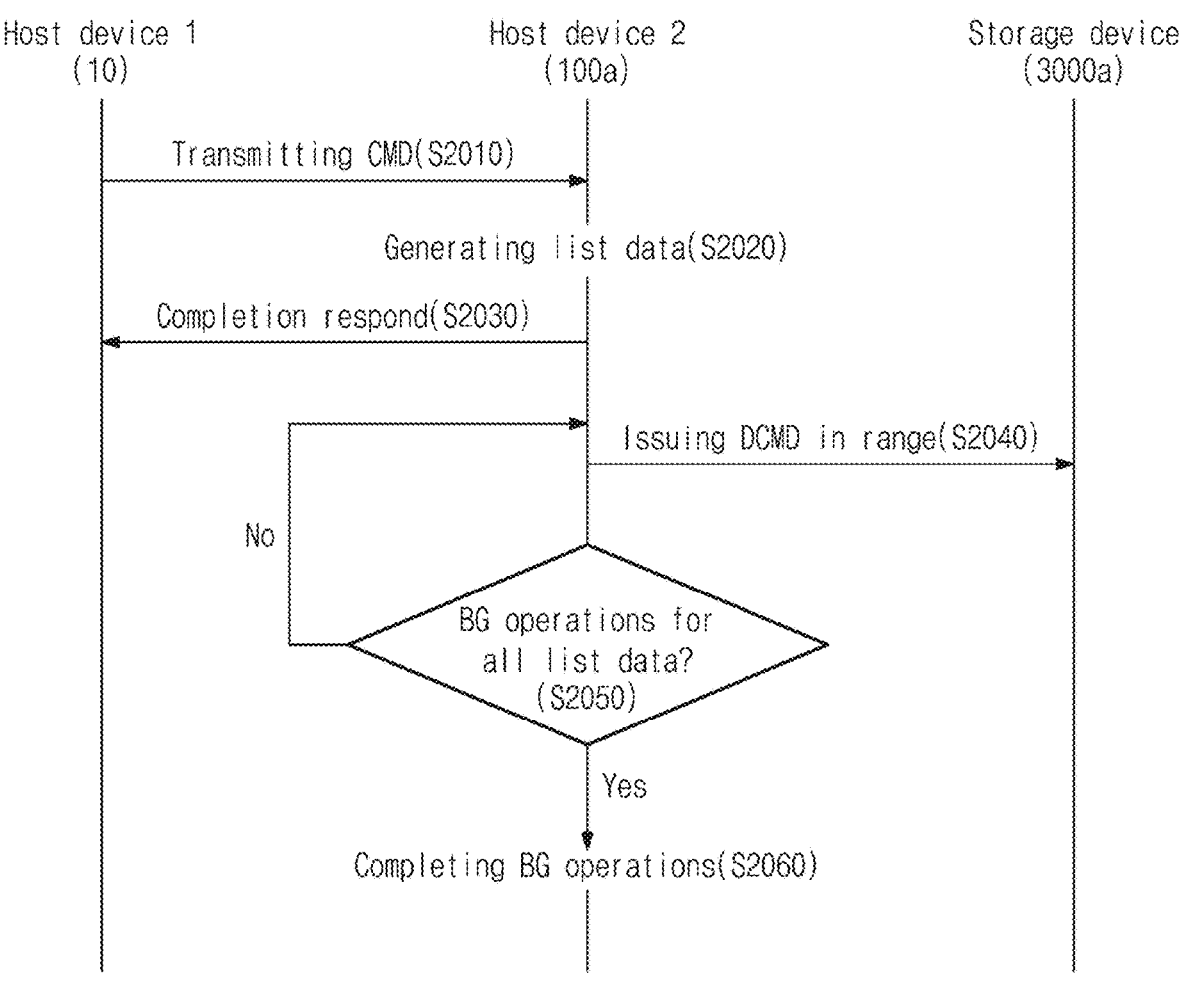
FIG. 15 is a flowchart of a method of operating a storage system, according to some example embodiments of the present disclosure.

FIG. 15 is a flowchart of a method of operating a storage system, according to some example embodiments of the present disclosure.

Referring to FIG. 15, according to some example embodiments, in operation S2010, the first host device 10 may transmit one command requesting an action for the plurality of group zones GZ0, GZ1, and GZm-1 to the second host devices 100a to 100m.

In operation S2020, the second host devices 100a to 100m may generate list information LD, which is information associated with the group zones GZ0, GZ1, and GZm-1 included in the one command. The second host devices 100a to 100m may store the generated list information LD in a buffer.

In operation S2030, the second host devices 100a to 100m may transmit the completion response Resp to one command to the first host device 10.

In operation S2040, the second host devices 100a to 100m may transmit the plurality of distribution commands DCMD1, DCMD2, and DCMDn corresponding to one command to the storage devices 3000a to 3000n, to 4000a to 4000n in a preset (or, alternatively, selected, or desired) processing range. The distribution commands DCMD1, DCMD2, and DCMDn may correspond to each of the plurality of zones GZ included in the storage devices 3000a to 3000n, to 4000a to 4000n. Operation S2040 may be performed in the background.

In operation S2050, the second host devices 100a to 100m may determine whether the background operation is performed for all of the plurality of group zones GZ0, GZ1, and GZm-1 included in the generated list information LD. The second host devices 100a to 100m may repeat operations S2040 and S2050 until the background operation is performed with respect to all of the plurality of group zones GZ0, GZ1, and GZm-1 included in the list information LD.

In operation S2060, the second host devices 100a to 100m may end the background operation.

According to some example embodiments of the present disclosure, an electronic device capable of preventing or reducing timeout by first providing a completion response when a command for a zone in units of volumes is issued and by internally processing distribution commands in a background and operating method thereof may be provided.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The above descriptions are specific example embodiments for carrying out the present disclosure. Example embodiments in which a design is changed simply or which are easily changed may be included in the present disclosure as well as some example embodiments described above. In addition, technologies that are easily changed and implemented by using the above example embodiments may be included in the present disclosure. While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. An electronic device comprising:
   a processor configured to
      receive a first command requesting an operation for a plurality of group zones from a host, transmit a first completion response to the first command to the host, and perform a first background operation for the first command; and a plurality of storage devices, the processor configured to control the plurality of storage devices, each of the plurality of group zones including a plurality of zones included in one or more storage devices among the plurality of storage devices, and the processor being configured to perform the first background operation including generating a plurality of first distribution commands for each of the plurality of storage devices from the first command, and issuing one or more first distribution commands among the plurality of first distribution commands to one or more of the plurality of storage devices corresponding to the one or more first distribution commands, respectively, in a queue, receive a second command for a first set of group zones among the plurality of group zones being received from the host after transmitting the first completion response to the host, generate a plurality of second distribution commands for each of the plurality of storage devices from the second command, issue a first set of the one or more first distribution commands for the first set of group zones ahead of an order indicated by the queue of the first background operation related to the first command, issue the plurality of second distribution commands from the second command for the first set of group zones after issuing the first set of the one or more first distribution commands for the first set of group zones ahead of the order indicated by the queue of the first background operation, and transmit a second completion response corresponding to the second command to the host, wherein the first set of group zones are subject to the first background operation.

2. The electronic device of claim 1, wherein the processor is configured to issue the one or more first distribution commands to the one or more storage devices at time periods, respectively.

3. The electronic device of claim 1, wherein the processor is configured to generate list information for the plurality of group zones, and the list information includes a buffered state and a stored state of for each of the plurality of group zones in the first command.

4. The electronic device of claim 3, further comprising:

one or more other storage devices configured to store the list information.

5. The electronic device of claim 4, wherein the processor is configured to update the list information according to a second set of group zones having processed the first background operation existing among the plurality of group zones.

6. The electronic device of claim 5, wherein the processor is configured to store the updated list information in the one or more other storage devices based on a number of the processed second set of group zones being greater than or equal to a threshold number.

7. The electronic device of claim 1, wherein the processor is configured to transmit the first completion response to the host before the first command is processed.

8. The electronic device of claim 1, wherein the processor is configured to resume the first background operation after transmitting the second completion response to the second command to the host.

9. The electronic device of claim 1, wherein the processor is configured to perform the first background operation in less time in an idle time of the processor than in a non-idle time of the processor.

10. A method of operation performed by an electronic device, the method comprising:

receiving a first command requesting an operation for a plurality of group zones from a host;

transmitting a first completion response to the first command to the host; and performing a background operation for the first command, each of the plurality of group zones including a plurality of zones included in one or more storage devices among a plurality of storage devices, and the background operation including generating a plurality of first distribution commands for each of the plurality of storage devices from the first command;

issuing one or more first distribution commands among the plurality of first distribution commands to the one or more storage devices corresponding to the one or more first distribution commands, respectively, in a queue;

receiving a second command for a first set of group zones among the plurality of group zones being received from the host after transmitting the first completion response to the host;

generate a plurality of second distribution commands for each of the one or more of storage devices corresponding the second command;

issuing the one or more first distribution commands for the first set of group zones ahead of an order indicated by the queue of the first background operation related to the first command;

issuing the plurality of second distribution commands from the second command for the first set of group zones after issuing the one or more first distribution commands for the first set of group zones ahead of the order indicated by the queue of the first background operation; and transmitting a second completion response corresponding to the second command to the host, wherein the first set of group zones are subject to the first background operation.

11. The method of claim 10, wherein the one or more first distribution commands are issued to the one or more storage devices at time periods, respectively.

12. The method of claim 10, further comprising:

generating list information for the plurality of group zones;

storing the list information in one or more other storage devices; and the list information includes a buffered state and a stored state of for each of the plurality of group zones in the first command.

13. The method of claim 10, wherein the transmitting of the first completion response to the host is performed before the first command is processed.

14. The method of claim 12, further comprising:

updating the list information in response to a second set of group zones having processed the first background operation existing among the plurality of group zones; and storing the updated list information in the one or more other storage devices based on a number of the processed second set of group zones being greater than or equal to a threshold number.

15. An electronic device comprising:

a processor configured to receive a first command requesting an operation for a plurality of group zones from a host, generate list information for the plurality of group zones, transmit a first completion response to the first command to the host, and perform a first background operation for the first command; and a plurality of storage devices, the processor configured to control the plurality of storage devices, each of the plurality of group zones including a plurality of zones included in one or more storage devices among the plurality of storage devices, the processor configured to perform the first background operation including generating a plurality of first distribution commands for each of the plurality of storage devices from the first command, and issuing one or more first distribution commands among the plurality of first distribution commands to one or more storage devices corresponding, to a respective one of the one or more first distribution commands, in a queue the one or more storage devices among the plurality of storage devices is configured to store the list information in a memory area of the one or more storage devices, the processor configured to receive a second command for a first set of group zones among the plurality of group zones being received from the host after transmitting the first completion response to the host, generate a plurality of second distribution commands for each of the plurality of storage devices from the second command, issue a first set of the one or more first distribution commands for the first set of group zones ahead of an order indicated by the queue the first background operation related to the first command, issue the plurality of second distribution commands from the second command for the first set of group zones after issuing the first set of the one or more first distribution commands for the first set of group zones ahead of the order indicated by the queue of the first background operation, and transmit a second completion response corresponding to the second command to the host, wherein the first set of group zones are subject to the first background operation.

16. The electronic device of claim 15, wherein the processor is configured to update the list information according to a second set of group zones having processed the first background operation existing among the plurality of group zones, and store the updated list information in the memory area based on a number of the processed second set of group zones being greater than or equal to a threshold number.

\*   \*   \*   \*   \*